United States Patent
Tuma et al.

(10) Patent No.: US 11,514,698 B2
(45) Date of Patent: Nov. 29, 2022

(54) INTELLIGENT EXTRACTION OF INFORMATION FROM A DOCUMENT

(71) Applicant: Accenture Global Solutions Limited, Dublin (IE)

(72) Inventors: Carlos Gaston Besanson Tuma, Barcelona (ES); Jaime Rodriguez Lagunas, Barcelona (ES); Sandra Orozco Martín, Barcelona (ES); Esperanza Eugenia Puigserver Martorell, Barcelona (ES); Joan Verdu Arnal, Tarragona (ES); Reynaldo Alberto España Rey, Barcelona (ES)

(73) Assignee: Accenture Global Solutions Limited, Dublin (IE)

(*) Notice: Subject to any disclaimer, the term of this patent is extended or adjusted under 35 U.S.C. 154(b) by 323 days.

(21) Appl. No.: 16/930,382

(22) Filed: Jul. 16, 2020

(65) Prior Publication Data

US 2021/0064860 A1  Mar. 4, 2021

(30) Foreign Application Priority Data

Aug. 30, 2019  (EP) .................................. 19382737

(51) Int. Cl.
*G06V 30/412* (2022.01)
*G06N 20/00* (2019.01)
*G06K 9/62* (2022.01)

(52) U.S. Cl.
CPC ......... *G06V 30/412* (2022.01); *G06K 9/6227* (2013.01); *G06N 20/00* (2019.01)

(58) Field of Classification Search
None
See application file for complete search history.

(56) References Cited

U.S. PATENT DOCUMENTS 8,705,836 B2    4/2014  Gorski et al.
2017/0206409 A1*  7/2017  Bataller .................. G06Q 10/00
(Continued)

OTHER PUBLICATIONS

ABBYY.technology [online], "Forms Processing [Technology Portal]," Jan. 2, 2017, retrieved on Feb. 28, 2019, retrieved from URL<https://abby.technology/en:features:scenario:forms_processing>, 3 pages.
(Continued)

*Primary Examiner* — Dov Popovici
(74) *Attorney, Agent, or Firm* — Fish & Richardson P.C.

(57) ABSTRACT

Methods, systems, and apparatus, including computer programs encoded on a computer storage medium, for performing intelligent extraction of information from a document. A computing module receives input data representing an image of a document. The module also receives context data for the document. The context data includes parameters that are descriptive of the document in the image. The module processes the input data and the context data to determine a complexity value that characterizes a level of complexity in identifying information to be extracted from the document. The system selects a machine-learning model to use in extracting information from the document. The model is selected based on the complexity value and from multiple candidate models. The system extracts information from the document using the selected model, including converting a portion of the image of the document that shows typed or handwritten text into a digitized text string.

20 Claims, 6 Drawing Sheets

(56) References Cited

U.S. PATENT DOCUMENTS

2018/0129990 A1* 5/2018 Clooten ............. G06Q 10/0637
2018/0150956 A1 5/2018 Kao et al.
2018/0268448 A1* 9/2018 Simantov ............... G06N 20/00
2020/0374526 A1* 11/2020 Zhou ........................ G06N 3/08

OTHER PUBLICATIONS

Chronoscan.org [online], "Document Templates," available on or before Jul. 6, 2016, via Internet Archive: Wayback Machine URL<https://web.archive.org/web/20160706112228/https://www.chronoscan.org/wcidoc/document_templates.htm>, retrieved on Feb. 28, 2019, retrieved from URL<https://www.chronoscan.org/wcidoc/document_templates.htm>, 1 page.

Microsoft.com [online], "Making sense of Handwritten Sections in Scanned Documents using the Azure ML Package for Computer Vision and Azure Cognitive Services." May 7, 2018, retrieved on Feb. 28, 2019, retrieved from URL<https://www.microsoft.com/developerblog/2018/05/07/handwriting-detection-and-recognition-in-scanned-documents-using-azure-ml-package-computer-vision-azure-cognitive-services-ocr/>, 14 pages.

Nguyen et al., "Automatic Extract Handwriting Marked Regions in Business Document Images," Proceedings of the 2018 International Conference on Advanced Computing and Applications (ACOMP), Nov. 27-29, 2018, Ho Chi Minh City, Vietnam, 112-116.

Extended European Search Report in EP Appln. No. 19382737.5, dated Nov. 4, 2019, 8 pages.

Mao et al., "Document Structure Analysis Algorithms: A Literature Survey," Proceedings of SPIE Document Recognition and Retrieval X, Santa Clara, CA, USA, Jan. 20-24, 2003, 5010:197-207.

Chronoscan.org [online], "Nuance 2.0 ICR Engine (Handwriting)," available on or before Jun. 30, 2017, via Internet Archive: Wayback Machine URL<https://web.archive.org/web/20170630224156/https://www.chronoscan.org/doc/nuance_2_0_icr_engine__handwriting_.htm>, retrieved on Aug. 3, 2022, retrieved from URL<https://www.chronoscan.org/doc/nuance_2_0_icr_engine__handwriting_.htm>, 1 page.

* cited by examiner

INTELLIGENT EXTRACTION OF INFORMATION FROM A DOCUMENT

CROSS-REFERENCE TO RELATED APPLICATION

This application claims priority to European Patent Application No. 19382737.5, filed on Aug. 30, 2019, entitled "Intelligent Extraction of Information from a Document," the entirety of which is hereby incorporated by reference.

FIELD

This specification relates to intelligent extraction and digitalization of information in a document.

BACKGROUND

Many entities across different industries still use paper based processes for storing and retrieving information associated with a particular information source, such as a transaction file or client record. For example, a transaction file can be a set of physical documents that each include information formed from different types of text. Information contained in the set of physical documents are accessed and handled in accordance with an objective of each paper based process. In some cases, the set of physical documents is electronically scanned to generate an image file that includes an electronic or digital representation of each physical document in the set.

SUMMARY

This specification describes techniques for performing intelligent extraction of information from a document. A document analyzer receives input data representing an image of a document. The document can be an invoice statement, an item inventory card, or an employment agreement that is scanned and stored as an image file or another electronic format, for example. An intelligent extraction engine of the document analyzer receives context data for the document. The context data includes parameters that are descriptive of the document in the image. For example, the context data can include parameters that identify a type of the document as being an invoice statement or that describe the document as including several different formats, labels, or data fields that include typed or handwritten text.

The intelligent extraction engine processes the input data and the context data to determine a complexity value that characterizes a level of complexity in identifying information to be extracted from the document. The extraction engine interacts with a model selector to select a particular machine-learning model to use in extracting and converting information from the document. The model is selected based on the complexity value and from multiple candidate models. For example, the model selector can select a deep-learning model of a machine-learning engine that includes multiple candidate models. The intelligent extraction engine extracts information from the document using the selected deep-learning model. Extracting the information can include converting a portion of the image of the document that shows typed or handwritten text into a digitized text string.

One aspect of the subject matter described in this specification can be embodied in a computer-implemented method. The method includes receiving, by a first module of a computing system, input data representing an image of a document and receiving, by the first module of the computing system, context data for the document, wherein the context data comprises parameters that are descriptive of the document in the image represented by the input data. The method further includes processing, by the first module of the computing system, the input data and the context data to determine a complexity value that characterizes a level of complexity in identifying information to be extracted from the document; selecting, based on the complexity value and from a plurality of candidate machine-learning models, a particular machine-learning model to use in extracting information from the document; and extracting information from the document using the particular selected machine-learning model, including converting a portion of the image of the document that shows typed or handwritten text into a digitized text string.

These and other implementations can each optionally include one or more of the following features. For example, in some implementations, processing the input data and the context data includes: determining a quantity of labels, each label in the quantity of labels corresponding to a distinct portion of information in the document; and identifying one or more reference templates that each correspond to the document based on the determined quantity of labels.

In some implementations, determining the complexity value includes: determining that the quantity of labels exceeds a threshold quantity; identifying a particular reference template in response to determining that the quantity of labels exceeds the threshold quantity; and determining the complexity value based on the particular reference template.

In some implementations, the particular reference template is a complex template including a plurality data fields, each data field of the plurality of data fields corresponds to a respective label in the quantity of labels, and each data field includes a term corresponding to one or more terms in the extracted information that is converted into the digitized text string.

In some implementations, selecting the particular machine-learning model includes: determining, based on the complexity value, that the level of complexity in identifying information to be extracted from the document exceeds a threshold level; and selecting the particular machine-learning model in response to determining that the level of complexity exceeds the threshold level.

In some implementations, selecting the particular machine-learning model includes: selecting a deep-learning model when (i) the quantity of labels exceeds the threshold quantity and (ii) the complexity value indicates the level of complexity in identifying information to be extracted from the document exceeds the threshold level.

In some implementations, selecting the particular machine-learning model includes: selecting a machine-learning classifier when (i) the quantity of labels is below the threshold quantity and (ii) the complexity value indicates the level of complexity in identifying information to be extracted from the document is below the threshold level.

In some implementations, selecting the particular machine-learning model includes selecting the particular machine-learning model from a machine-learning engine, the machine-learning engine includes at least two predictive models corresponding to the plurality of candidate machine-learning models, and the at least two predictive models includes: a machine-learning model that is operable to extract information relating to a region of interest in the image of the document; and a deep-learning model operable to read discrete terms in the region of interest or read discrete characters of the discrete terms in the region of interest.

In some implementations, converting the portion of the image of the document into the digitized text string includes: using the deep-learning model to convert the extracted information from the document in response to reading discrete terms in the region of interest. In some implementations, converting the portion of the image of the document into the digitized text string includes: using the particular deep-learning model to convert the extracted information from the document in response to reading discrete characters of the discrete terms in the region of interest.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular implementations and can result in one or more of the following advantages. The described techniques can be used to implement an intelligent document analyzer that enables efficient retrieval and conversion of text-based information, including a variety of data strings, from an image-based source. The information and data strings that are extracted and converted from the image source can include both handwritten and typed information content. The document analyzer includes an intelligent extraction engine that is operable to generate digitized character strings based on the information that is retrieved from an example physical (e.g., paper-based) document source. The physical documents can be scanned into an electronic or digital image-based format to facilitate the information retrieval.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
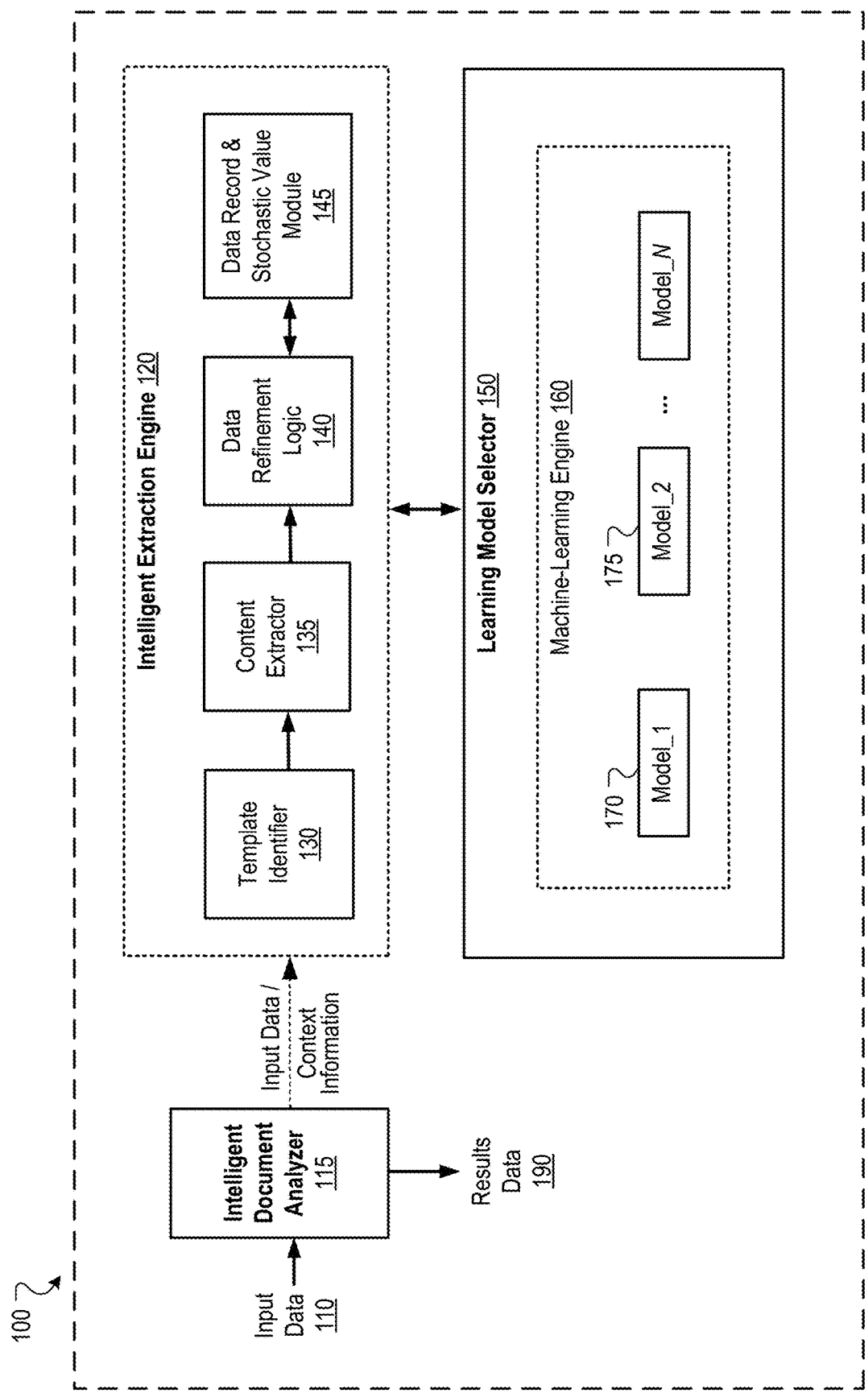
FIG. 1 shows an example computing system that performs intelligent extraction of information from a document.

FIG. 1 shows an example computing system 100 that performs intelligent extraction of information from a document. As described in this specification, the system 100 is operable to receive input data 110 that is processed and digitized using one or more computing modules of the system.

As used with reference to the described techniques, a "document" represents a discrete unit of digital content or electronic information (e.g., text data, electronic documents, data structures, electronic files, multimedia content, image data, or another unit of content). A document can be electronically stored in a physical memory device as a single file or as a collection of files. Documents can take the form of application files, data arrays, multimedia files, image (or video) files, text files, or data objects such that a data object is a type of digital document. Such documents may be digital or electronic versions of physical documents, e.g., paper-based documents that have been scanned, photographed, or otherwise acquired in a digital format. Similarly, "data object" can refer to a portion of a digital document.

As used in this specification, the term "module" includes, but is not limited to, one or more computers configured to execute one or more software programs that include program code that causes a processing device of the computer to execute one or more functions. The term "computer" includes any data processing device, such as a desktop computer, a laptop computer, a mainframe computer, a personal digital assistant, a server, a handheld device, or any other device able to process data.

The input data 110 can represent an image of a document. The input data 110 can be a digital or electronic image of a physical document. For example, the input data 110 can be a digital image of transaction log, a receipt, a contractual agreement, a credit card application, an employment document, an item inventory listing, or a data record for a business entity. The digital image of the physical document can be generated in response to scanning the document or capturing an image of the document using an image sensor of a digital camera.

System 100 includes an intelligent document analyzer 115 that processes the input data 110 using one or multiple computing modules that interact to intelligently extract and digitize information obtained from a document in an image representing the input data 110. The document analyzer 115 includes an intelligent extraction engine 120. In some implementations, the extraction engine 120 includes multiple computing modules that are each operable to perform at least a portion of the computing processes used by system 100 to generate a digitized data string in response to extracting text and data characters forming the information included in the document.

As used in this document, a "digitized data string" can be a structured (or unstructured) sequence of characters, such as ASCII (American Standard Code for Information Interchange) characters. Hence, in some implementations, a digitized data string can be a digitized text string, a digitized character string, or a combination of each.

In this context, the document analyzer 115 of system 100 can generally include multiple computing modules and data storage devices. In particular, the document analyzer 115 can include a data repository that stores different document templates (described below) that are used to process the input data 110 to generate the digitized data string. In some implementations, each of the intelligent extraction engine 120, data repository, and other computing modules are included in the document analyzer 115 as a sub-system of hardware circuits (e.g., special-purpose hardware circuitry) that includes one or multiple processor microchips. In general, the document analyzer 115 can include multiple processors (e.g., central processing unit (CPU) or graphics processing unit (GPU)), memory, and data storage devices that collectively form the extraction engine 120 and other data processing resources of system 100.

Processors of system 100 or document analyzer 115 are each operable to process instructions for execution using the various resources of the system, including instructions stored in the memory or on the data storage devices to display graphical information for output at an example display monitor of system 100. In some implementations, execution of the stored instructions cause one or more of the actions described herein to be performed by the document analyzer 115 or other resources of system 100. In other implementations, the document analyzer 115 uses multiple processors, as appropriate, along with multiple memories and various types of memory.

For example, the document analyzer 115 can be coupled with multiple other types of computing devices, with each device (e.g., a server bank, groups of servers, modules, or a multi-processor system) performing portions of the actions, operations, or logical flows described in this specification. In some implementations, system 100 forms a data architecture that includes connections to a variety of data-lake computing solutions (e.g., third-party solutions) as well as solutions such as open-source programming languages and open-source visualization tools to enable system 100 to interact with different user/electronic devices. In some implementations, resources of system 100 communicate with an example cloud services platform to host one or more of these solutions.

In some examples, the data repository of document analyzer 115 is a central storage device or central template repository configured to store and provide access to a variety of document templates. These document templates stored in the data repository can include a predefined set of data fields or item labels as well as a particular format or layout used by the intelligent extraction engine 120 to analyze document images received by the system 100. The input data 110 includes context information such as image data, parameters, and user input values that are descriptive of a document in the image represented by the input data. For example, each document in the image can have a particular quantity of labels, a specific type of information layout, or a certain data format that aligns (e.g., substantially aligns) with a label set or data format of a document template stored in the data repository. In some implementations, the input data 110 or context information indicates a type or classification of the document in the image, and the document analyzer 115 can use the type or classification of the document in the image to map to specific information (e.g., a particular quantity of labels or information layout) about the document that corresponds to its type or classification.

The intelligent extraction engine 120 generally includes a template identifier 130, a content extractor 135, a data refinement logic 140, and a data record & stochastic value module 145. As described in more detail below, the intelligent extraction engine 120 is operable to process the input data 110, including a set of context data and other parameters of the input, to determine a complexity value that characterizes a level of complexity in identifying information to be extracted from a document in an image represented by input data 110. In some implementations, template identifier 130 in the intelligent extraction engine 120 is operable to determine the complexity value. In some cases, the intelligent extraction engine 120 uses the template identifier 130 as well as one or more other computing modules (e.g., a machine-learning model) to determine a complexity value characterizing the level of complexity in identifying information to be extracted from a document.

The template identifier 130 is used by the intelligent extraction engine 120 to determine an area or region of interest in an image of a document based on a template obtained from the template repository in document analyzer 115. As discussed below, the area of interest indicates regions, locations, or coordinates of the document that include relevant information to be extracted and converted. The template identifier 130 receives context data and parameters associated with the document. For example, the template identifier 130 can process at least the context data and parameters associated with the document to determine a complexity value based on parameter or user input values that indicate a quantity of labels identified in the document or a particular type of the document (e.g., an agreement or transaction log). The template identifier 130 is operable to access the template repository storing the different document templates that are used to for processing the input data 110.

The template identifier 130 can be based on a machine-learning model that is trained (e.g., during a training phase) to identify one or multiple document templates, such as a 'short' list of document templates, and to predict whether it is feasible to determine an area of interest in the image of the document based on the identified templates. For example, the template identifier 130 may employ a machine-learning model to identify from a larger set of defined templates a 'short' list of templates that correspond to the document represented in input data 110. The template identifier 130 can identify the 'short' list of templates based at least on the context information for the document or a complexity value determined for the document. The template identifier 130 can process one or more of the templates against the document to detect locations, regions, or coordinates of an identified template that are common between the document and the template.

For example, the context information can indicate a type of the document as a transaction log that includes at least four types of labels and six data fields, where each data field includes typed characters. The complexity value derived from this context information may indicate that it is feasible to determine an area of interest in the document based on an identified template. The template identifier 130 can identify one or more transaction log templates based at least on the type of the document or types of labels in the document. The template identifier 130 can process an identified template against the document to compute location coordinates for certain regions of interest in the document in which label types or data fields as well as typed text may be common between the document and the identified template. Based on this processing, the intelligent extraction engine 120 determines areas of interest using a set of coordinates or location information for content items that are common between the document in the image and one or more identified templates.

The intelligent extraction engine 120 then performs additional processing to retrieve the relevant information from the area of interest and to extract and convert the information. In some implementations, the template identifier 130 infers (e.g., determines or predicts) that it is not feasible to determine an area of interest in the image of the document based on one or more identified templates. For example, the template identifier 130 may arrive at this inference if it is unable to determine a sufficiently 'short' list of templates for processing against the document to efficiently determine an area of interest. In these instances, rather than using the template identifier 130 to identify a particular template, the intelligent extraction engine 120 uses an example machine-learning identifier (described below) to directly detect regions or areas of interest in an image of a document that include relevant information to be extracted and converted without previously identifying one or more templates.

The template identifier 130 identifies a particular template based on the information about the context data and parameters associated with the document. In some implementations, the template identifier 130 passes the identified template to at least one other module of the intelligent extraction engine 120. For example, the template identifier 130 may pass the identified template to the content extractor 135 to cause the content extractor to extract relevant text or other content items of the document. In some implementations, the context extractor 135 extracts the relevant text or other content items from the document with reference to annotations, data fields, or label types included in the template.

For example, the template can include a set of data fields where each data field includes text or characters that provide a description of a physical product included in an inventory list of a business entity. A first data field of the template can be annotated as typically including typed text that indicates the name of the product, whereas a second data field of the template can be annotated as typically including handwritten text, alphanumeric characters, or special characters that indicate an identifier of the product or other information that is descriptive of the product. In some implementations, the context extractor 135 extracts the relevant text or other content items from the document based on an area or region of interest in the document determined directly by a machine-learning identifier without reference to an identified template. The area of interest indicates regions and locations in the document that include relevant information to be extracted and converted to a digitized data string. In some implementations, the criteria for extracting relevant content items from the document directly by a machine-learning identifier, without reference to an identified template, can be determined based at least in part on the context information for the document or a complexity value for the document.

As described above, the content extractor 135 can identify text relating to the data fields of the document in the image as relevant text for extraction based on the data fields of the document being common to, matched to, or in alignment with one or more data fields of the template. The content extractor 135 is used to extract this relevant text to generate a digitized data string using text retrieved from the document. The digitized data string generated by document analyzer 115 corresponds to a set of results data (e.g., results data 190) which is described in more detail below.

The document analyzer 115 is operable to access, by way of intelligent extraction engine 120, a machine-learning engine 160 to select a particular machine-learning model. The machine-learning engine 160 includes one or more machine-learning models ("ML models"). Each of the one or more ML models can correspond to a trained data model that is configured to perform a particular type of machine learned analysis that is used by system 100 to intelligently extract and digitize information obtained from a document in an image representing the input data 110.

The document analyzer 115 interacts with each ML model of the machine-learning engine 160 to cause each model to learn and optimize different computational processes for extracting and converting information contained in an image-source or document of the input data 110. In some implementations, each ML model is configured to learn the computational processes based on analytical functions enabled by machine-learning algorithms that may be employed by, or encoded in, the machine-learning engine 160.

For example, during a training phase of the machine-learning engine 160 each ML model uses one or more example machine-learning algorithms to process model parameters derived from a training data set to learn or encode an initial set of computational processes. In some examples, the model inputs are derived from an example human user (e.g., based on user inputs received at system 100) such that a ML model can encode its computational processes based on analysis of user inputs as well as inputs derived from a training dataset. For example, a ML model may encode computing processes for defining an initial complexity threshold that is used by system 100 to select a particular type of trained model to extract information from the document. In this manner the machine-learning engine 160 is operable to generate specific types of trained data models that can be later used or invoked during an example implementation phase (discussed below) of the system 100.

For example, the machine-learning engine 160 can include a first model 170 and a second model 175. In some implementations, the machine-learning engine 160 has N number of models as indicated by the reference designation "Model_N" shown at FIG. 1. In these implementations, N is an integer equal to or greater than one. As described in more detail below, in some examples each of the N models represent respective ML models that are trained during a training phase of machine-learning engine 160, whereas in some examples each of the N models represent respective data models that have been trained to perform specific predictive or inference functions that enable intelligent extraction of information from documents of input data 110 during an implementation phase of machine-learning engine 160. In some examples, all or some of the N models can have different architectures and be configured to employ different algorithms/processes from each other.

During an example training phase each of the first model 170 and the second model 175 can represent respective ML models that are trained using a training dataset that includes multiple types of images, documents, or information types (e.g., handwritten or typed information types). For example, the training dataset can include several of the different types of example documents described above, such as digital images of transaction logs, receipts, agreements, application documents, employment agreements, data records, etc. The training dataset can be an annotated set of data that defines specific types of data fields, different label sets and quantities, and particular document layout or format options as well as other possible ways in which handwritten or typed information may be presented within a document.

During an example implementation phase, each of the first model 170 and the second model 175 represent respective data models that have been trained using the example training dataset. In some implementations, each of the first model 170 and the second model 175 represent a particular type of trained machine-learning model, such as a deep-learning model or a machine-learning classifier (e.g., a simple classifier). During the implementation phase, the document analyzer 115 interacts with the learning model selector 150 to select a particular type of trained data model based on analysis of context data or input parameters (e.g., user input) that are descriptive of the document in an image represented by the input data 110.

In some cases, the deep-learning model is operable to perform information extraction functions that may be required for more complex documents, whereas the machine-learning classifier can be a simple classifier that includes less processing power than the deep-learning model and/or that is trained using a training dataset with limited annotations or document varieties. For example, the simple classifier can be a machine-learning identifier that is operable to determine an area or region of interest in an image of a document. The area of interest indicates regions and locations in the document that include relevant information to be extracted and converted. As indicated above, the training dataset can include various categories of annotated documents or information types (e.g., handwritten or typed information types) that are received from different images sources. The complex documents can be documents in which context data or attributes of the input data 110 indicate the document includes a more complex information set that likely is not suitable for analysis using a simple machine-learning classifier.

The data refinement logic 140 interacts with the data record & stochastic value module 145 to further refine an overall term extracted from a document or to further refine a discrete character in a string of characters extracted from a document. In some implementations, the data refinement logic 140 uses the data record & stochastic value module 145 to refine a term or discrete character value in response to (a) determining whether an initial extracted term matches a corresponding term in a database record stored at system 100, (b) determining whether an initial extracted character matches a corresponding character in a database record stored at system 100, or both (a) and (b).

Figure 2:
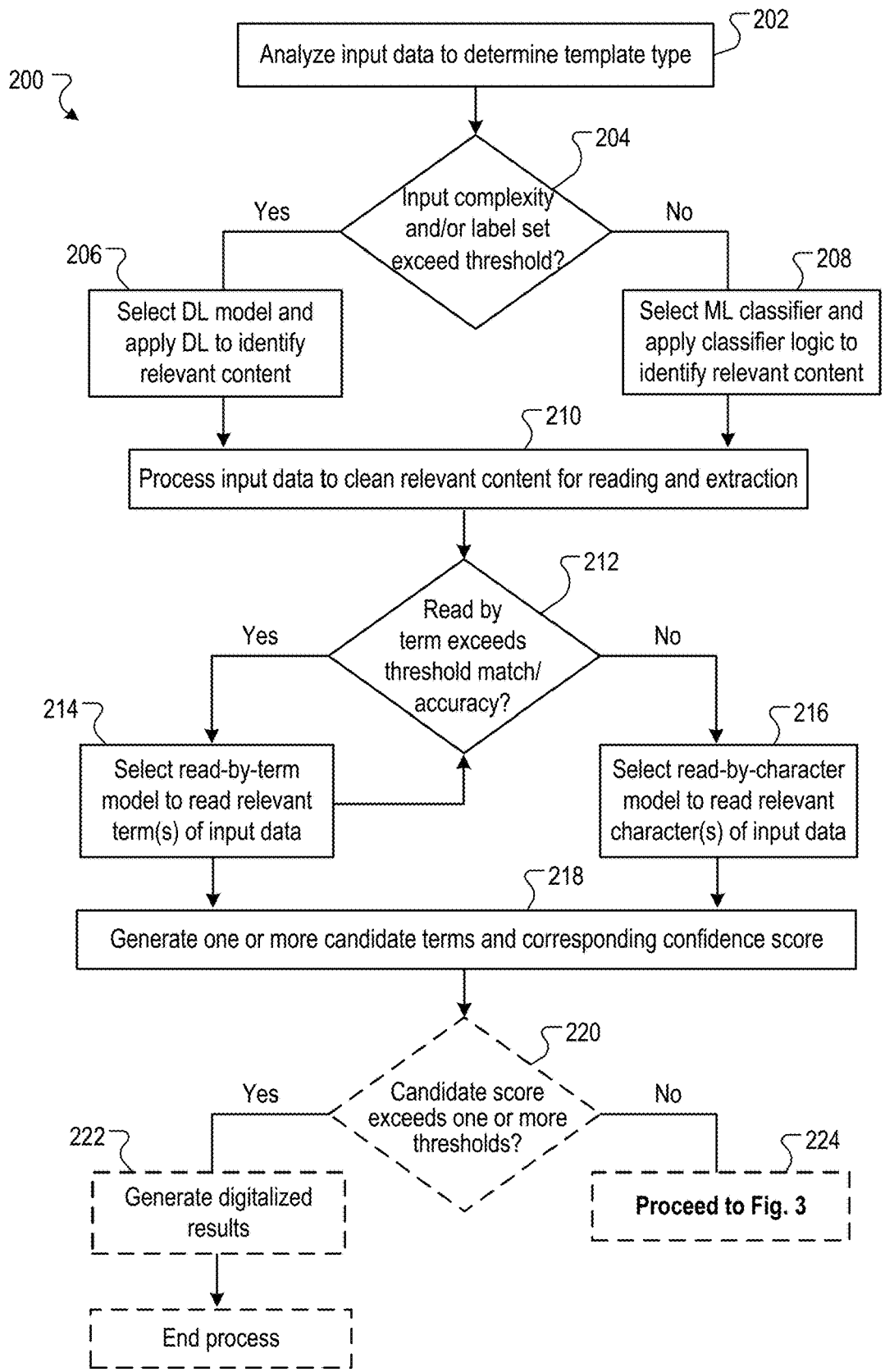
FIG. 2 shows an example process for performing intelligent extraction of information from a document.

FIG. 2 shows an example process for performing intelligent extraction of information from a document. Process 200 can be implemented or executed using the system 100 described above. Descriptions of process 200 may reference the above-mentioned computing resources of system 100. In some implementations, described actions of process 200 are enabled by programmed firmware or software instructions that are executable by at least one processor and memory of computing systems described in this document.

Referring now to process 200, a first module of system 100 receives input data representing an image of a document. The first module can correspond to the document analyzer 115, the intelligent extraction engine 120, or both. In some implementations, the first computing module corresponds to at least one of the computing modules that may be included in the intelligent extraction engine 120. As described in more detail below, the document in the image includes information that is to be converted to a digitized data string.

The intelligent extraction engine 120 analyzes the input data 110 to identify a template associated with the document in the image or to determine a particular template type associated with the document (202). The analysis of the input data 110 can include analyzing content of the document image represented in the input data 110, context data for the document that is received in connection with the input data 110, or both. The context data can include parameters that are descriptive of the document in the image represented by the input data 110. For example, the context data can describe the document type as being an item inventory card, a purchase receipt, or an employment application, and the parameters can indicate a quantity of labels viewable on the inventory card, the receipt, or the application, as well as the types of data fields on the inventory card, the receipt, or the application. The intelligent extraction engine 120 identifies a template or a particular template type based on the descriptive information about the document that is obtained using at least the context data.

In some implementations, a set of parameters indicate that a first data field contains typed content (e.g., text or numeric characters), a second data field contains handwritten content, and a third data field is formatted to be able to receive typed content, handwritten content, or a combination of each. In some cases, the context data includes user input that specifies a type of the document. For example, the user input can indicate the document is a type of item inventory card, a type of procurement receipt, or a type of contractual agreement. In some examples, the user input indicates the document is a type of inventory card that includes information describing a product or item located in a storage facility of a business entity.

The document analyzer 115 determines whether each of an input complexity associated with the document and/or a label set associated with the document exceeds one or more complexity thresholds (204). In some implementations, a complexity threshold used when analyzing a new document use case is defined during a training phase of an example ML model and is later refined as the ML model receives and processes additional data for that and other use cases. The document analyzer 115 processes the input data 110 and the context data to determine a complexity value that characterizes a level of complexity in identifying information to be extracted from the document. The document analyzer 115 can determine the complexity value based on the type of the document, the quantity of labels in the document, the particular types of data fields and labels in the document, a specific type of information layout in the document, a certain data format associated with the document, or a combination of each.

For example, a document type that is an item inventory card with a non-standard data format and including several labels (e.g., more than 15) or several different types of labels (e.g., date, serial number (S/N), product identifier, stock-keeping unit (SKU), product name, expiration date, remarks/observations, assembly location, etc.) as well as multiple data fields that are formatted to receive a combination of typed and handwritten text, might receive a relatively high complexity value (e.g., 0.91). In contrast to this particular type of item inventory card, a purchase receipt that includes fewer (or substantially fewer) labels, a more standardized data format, and only typed text might receive lower complexity value (e.g., 0.23) relative to the item inventory card. In some implementations, multiple respective complexity values can be generated for different sections of a single document based on, for example, the differing levels of complexity that may be associated with identifying information to be extracted from a given section of the document.

The intelligent extraction engine 120 selects a particular machine-learning model to use in extracting information from the document based at least on the complexity value. In some implementations, the particular machine-learning model is selected from among two or more candidate machine-learning models. For example, the particular machine-learning model can be selected from among candidate models such as (i) a deep-learning (DL) data model with substantial processing power that is trained to recognize, extract, or convert information in a document using certain types of deep-learning algorithms that are based on neural networks (e.g., a convolutional neural network (CNN) or a recurrent neural network (RNN)), (ii) a classifier model (e.g., a simple classifier or ML identifier) that is trained to identify areas or regions of interest in a document, each area of interest including relevant information to be extracted and converted to a digitized data string, and (iii) one or more other data models (e.g., DL data models) that are trained to perform processes for reading discrete terms and/or reading discrete characters from relevant content/information in the area of interest identified to be extracted from a document.

If the complexity value exceeds an example threshold value of 0.6, the intelligent extraction engine 120 passes the outcome of the threshold comparison to the learning model selector 150 to cause the model selector to select a deep-learning machine-learning model (206). The intelligent extraction engine 120 applies the deep-learning (DL) computational processes of the selected model to identify relevant content in the document that is to be extracted and converted to a digitized text string, a digitized character string, or both.

If the complexity value does not exceed or is below an example threshold value of 0.6, the intelligent extraction engine 120 passes the outcome of the threshold comparison to the learning model selector 150 to cause the model selector to select a classifier model (208). The intelligent extraction engine 120 applies the computational processes of the selected classifier model to identify relevant content in the document that is to be extracted and converted to a digitized text string, a digitized character string, or both.

The intelligent extraction engine 120 causes the content extractor 135 to extract information from the document using the particular selected machine-learning model. In some implementations, this process of extracting relevant text or character content from the document includes converting at least one portion of the image of the document that shows typed or handwritten text into a digitized text string. In some implementations, the content extractor 135 processes the input data 110 to clean the identified relevant content for reading and extraction using the selected data model (210).

In some implementations, the content extractor 135 interacts with the selected machine-learning model while referencing an identified template to identify, extract, and convert the relevant content in the document to a digitized text string, a digitized character string, or both based on information in the template. For example, the identified template passed to the content extractor 135 can be provided to, or used by, the selected data model to extract relevant text or other content items of the document with reference to annotations, data fields, or label types included in the identified template.

In some implementations, the selected data model uses a first template identified for a first portion of content in a document to extract and convert that content to a digitized text string, while concurrently using a second, different template identified for a second portion of content in the document to extract and convert that content to a digitized text string. The different first and second templates may be selected based on the differing levels of complexity in identifying information to be extracted from the first and second portions of the document.

For example, the first portion of the document may be a section of an inventory card that includes multiple labels (e.g., expiration date, remarks/observations, assembly location), complex or overlapping data formats, and combinations of data fields that have handwritten and typed text, whereas the second portion of the document may be a section of the inventory card that includes a fewer quantity of labels, a single standard data format, and only typed text. In some implementations, the first section and the second section are the same section.

The intelligent document analyzer 115 is operable to perform one or more read operations to extract the relevant content from a document of the input data 110 and to convert the extracted content to generate the digitized data string. The instructions shown below represent an example code sequence that can be processed at the intelligent extraction engine 120 to read, extract, and convert the relevant content of the document to generate the digitized data string.

```
}
# Clean Relevant Fields
relevant_fields=clean_all_but_text(relevant_fields)
# Read Relevant Content
if (read_by_Word==TRUE){
    readings=Text_Reading_RNN(relevant_field)
} else (read_by_character==TRUE) {
    chars_by_field=Character_crop(relevant_field)
    readings=Character_Reading_CNN(chars_by_field)
}
```

Processing the example code sequence can include determining whether a read-by-term match (or accuracy) value exceeds a threshold value (212). For example, the selected data model can generate a match value that indicates a probability of accurately reading or converting a discrete terms of a data field associated with relevant content to be extracted, converted, or both. In some implementations, a term that is identified as being relevant for extraction or conversion is processed against a predefined term/word list or ground truth table stored in the selected data model. If the identified term matches (or substantially matches) a particular term or word in the predefined word list, then the selected data model is operable to generate a read-by-term match value that exceeds the threshold value.

If the selected data model determines that the read-by-term match (or accuracy) value exceeds the threshold value, then the data model selects the read-by-term model to perform one or more operations (214) for reading and extracting or converting discrete terms of a data field in the input data 110 that represents the image of the document. If the selected data model determines that the read-by-term match (or accuracy) value does not exceed the threshold value, then the data model selects the read-by-character model (e.g., a CNN deep-learning data model) to perform one or more operations (216) for reading and extracting or converting discrete characters of a data field in the input data 110.

Processing the example code sequence can include using the selected data model to invoke, call, or otherwise access a read-by-term model that is operable to read, extract, and convert information from a data field of the document in response to the read-by-term model recognizing a discrete words or terms in the relevant content to be extracted. For example, the read-by-term model can recognize and convert a discrete word (e.g., book) by reading a first letter of the word (e.g., "b"), reading a second letter of the word (e.g., "o"), reading a third letter of the word (e.g., "o"), and then inferring that the last letter of the word is a "k" based on the first three letters matching letters of a word in the word list or ground truth table.

Processing the example code sequence can also include using the selected data model to invoke a read-by-character model that is operable to read, extract, and convert information from a data field of the document in response to the read-by-character model recognizing a discrete character in the relevant content to be extracted. In some implementations, processing the example code sequence includes the intelligent extraction engine 120 performing a data cleanse operation to clean or remove information other than the relevant data fields of the document having the discrete terms, words, or characters to be read. In some implementations, an operation performed by at least one of the data includes using optical character recognition (OCR) to convert the extracted terms or characters to a format that is suitable for generating a digitized data string that reflects the extracted terms or characters.

In some examples, each of the read-by-term models and the read-by-character models can generate one or more candidate terms and the intelligent extraction engine 120 causes the selected data model to generate a corresponding confidence score for each candidate term (218). The respective confidence score for each candidate term indicates the extent to which the converted term is believed to match the corresponding term in the data field of the document in the image of the input data 110.

For example, a first candidate term (e.g., book) in a data field of the document that includes typed text can receive a relatively high confidence score (e.g., 0.92) to indicate a high probability that the converted term matches (or substantially matches) the actual corresponding term in the data field of the document. If the confidence score for the first candidate term exceeds a threshold confidence score (e.g., 0.9) or is the highest confidence among the respective confidence scores for other competing first candidate terms, then the intelligent extraction engine 120 uses that particular first candidate term to generate at least a portion of the digitized data string as results data (222). In some implementations, the intelligent extraction engine 120 uses one or more example processes to refine candidate terms as described in more detail below with reference to FIG. 3A and FIG. 3B (224).

Figure 3A:
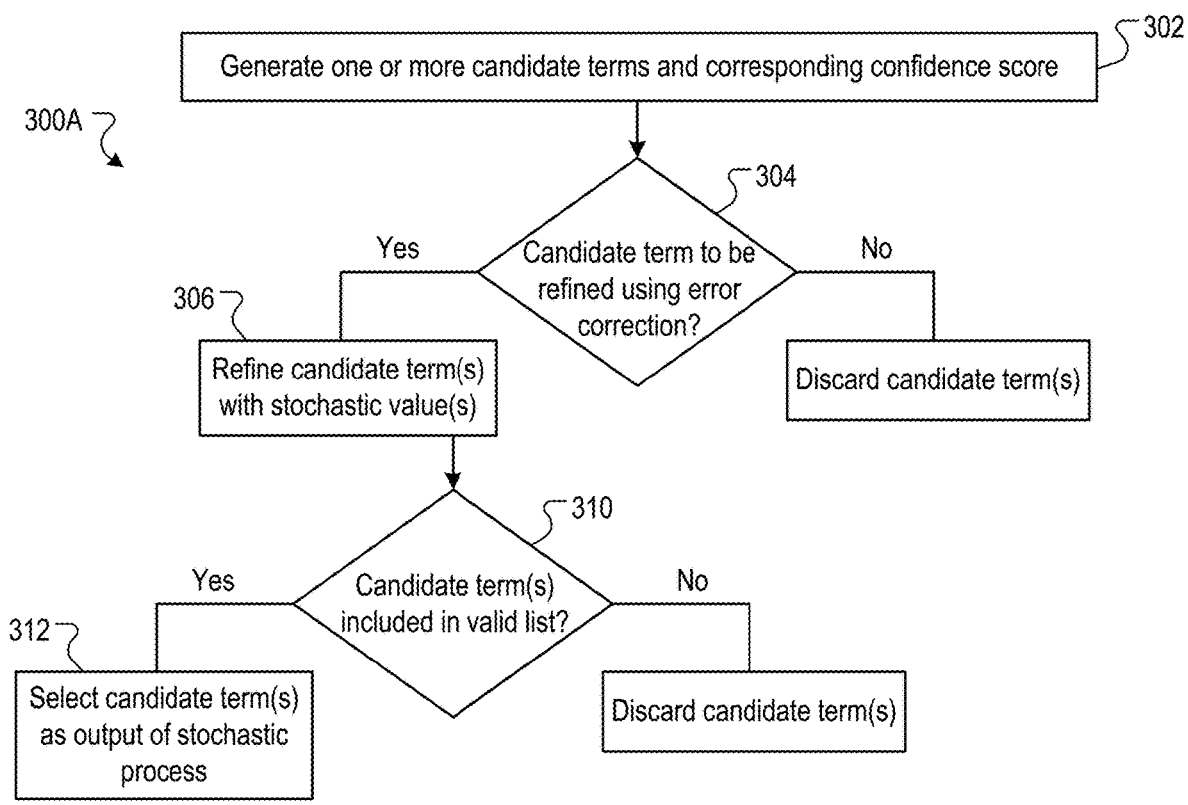
FIGS. 3A and 3B each show an example process for refining a candidate term based on a stochastic value to perform intelligent extraction of information from a document.
Figure 3B:
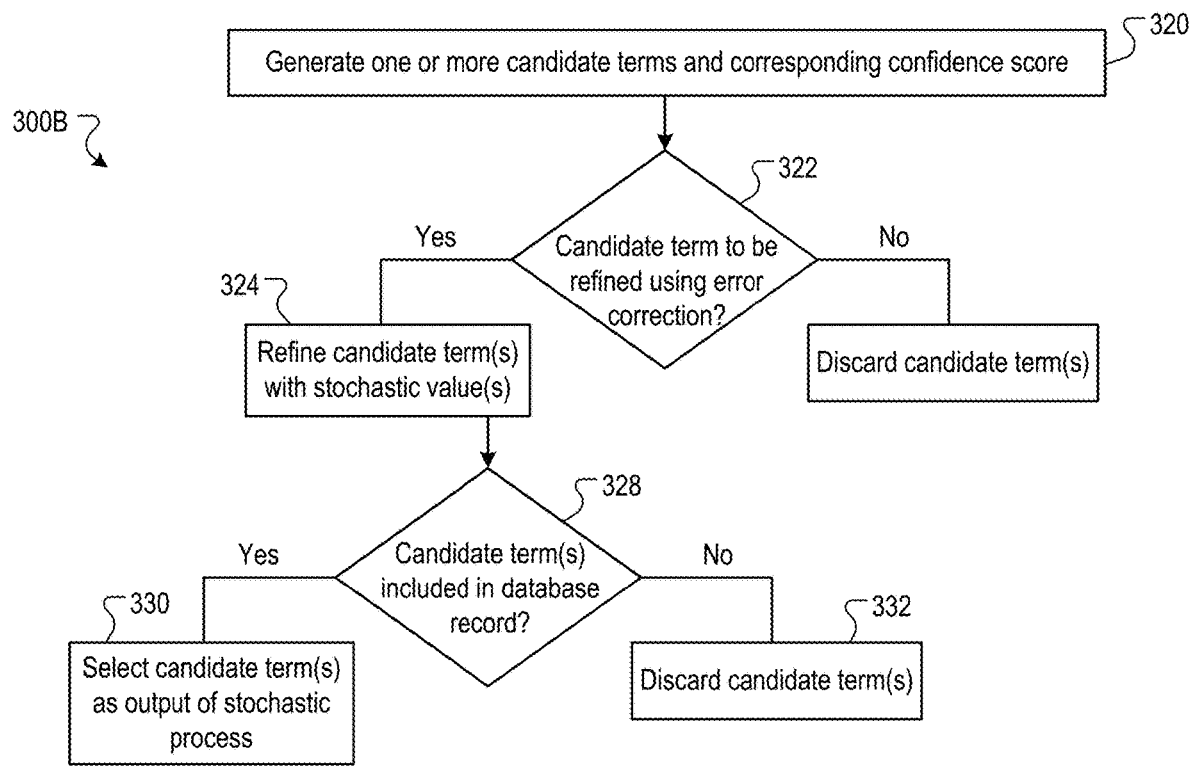

FIG. 3A and FIG. 3B each show an example process for refining a candidate term based on a stochastic value to perform intelligent extraction of information from a document.

Referring now to FIG. 3A, each of the read-by-term models (e.g., a RNN deep-learning data model) and the read-by-character models (e.g., a CNN deep-learning data model) can generate one or more candidate terms and the intelligent extraction engine 120 causes the selected data model to generate a corresponding confidence score for each candidate term (302). In contrast to the first candidate term (e.g., book) discussed above, a second candidate term (e.g., V5605QA1) that is generated for a data field of a document that includes handwritten text may receive a relatively low confidence score (e.g., 0.31) to indicate a low probability that the converted term matches (or substantially matches) the actual corresponding term in the data field of the document.

The intelligent extraction engine 120 can determine whether a candidate term requires error correction or refining based on one or more factors (304). In one example, a candidate term may require error correction or refining if a confidence score for the candidate term does not exceed a threshold confidence score (e.g., 0.73) or if the confidence score is among the lower confidence scores of the respective confidence scores for other competing candidate terms. In another example, a candidate term may require error correction or refining if the candidate term is derived from an actual term that is handwritten and the converted candidate term appears to include certain unrecognized values or extraneous characters.

The intelligent extraction engine 120 uses the data refinement logic 140 and the data record & stochastic value module 145 to execute one or more example processes for refining the candidate terms based at least on a stochastic value (306). The data refinement logic 140 interacts with the data record & stochastic value module 145 to further refine a candidate term extracted from a document in an image based on one or more processes. In some implementations, the data refinement logic 140 uses the selected data model (e.g., a deep-learning model) to compute and output a probability value for each character value of a candidate term per each character position within the candidate term. This process is described in more detail below with reference to FIG. 4.

For example, if a candidate term is "6V90035" corresponding to an item number in an image of a receipt, then the data model computes and outputs a first probability value (e.g., 0.69) for the character value "6" at the first position, a second probability value (e.g., 0.82) for the character value "V" at the second position, a third probability value (e.g., 0.73) for the character value "9" at the third position, and so on. In some implementations, a probability value can be referred to herein alternatively as a confidence score to indicate or characterize the likelihood that a generated term or character value matches an actual term or character in an image of a document.

The data refinement logic 140 can also use the data model (e.g., a RNN deep-learning model) to perform stochastic matching using most likely valid values or terms among the ones that are available in a dictionary of valid values. For example, the data model combines the respective probability values for discrete characters across multiple candidate terms to obtain a corrected or refined candidate term that is the most likely candidate term for generating at least a portion of the digitized data string. The data model is also used to determine whether the most likely candidate term, including discrete values for characters in the term, matches (or substantially matches) a dictionary listing of valid values for candidate terms in the listing (310).

For example, the data refinement logic 140 can compute a match score that characterizes a suspected match between the refined candidate term and a candidate term in the listing valid terms and character values. Likewise, the data refinement logic 140 can compute a match score that characterizes a suspected match between one or more discrete characters of the refined candidate term and discrete characters in the listing valid terms and character values. The data refinement logic 140 selects a particular candidate term from the listing of valid terms corresponding to the highest match score and either passes that candidate term as an output (e.g., a stochastic value) of the stochastic process or augments the refined candidate term to include a character value in the listing of valid values and passes the augmented candidate term as an output (e.g., a stochastic value) of the stochastic process (312).

The dictionary listing of valid character values or valid terms can correspond to a dictionary of terms, character sequences, or predefined lists of words that are typically associated with the different types of input data 110 received by system 100. In some implementations, the data refinement logic 140 refines or corrects a candidate term using probabilistic correction according to a determined frequency of text or words mined from annotated documents. The data refinement logic 140 can also use or compute a weight probability of uncertain OCR-HWR (handwritten recognition) results by frequency on annotated documents.

In some implementations, an example process for correcting a candidate term includes the intelligent extraction engine 120 obtaining an example code reading (e.g., "AW124RT"). The data model can access a dictionary listing of valid values/terms as well as a curated list of past readings performed at system 100. The deep-learning data model is operable to compute a percent (%) frequency of the occurrence of letter 'A' in the first position of a code, e.g., how many times the intelligent extraction engine 120 has accurately detected the "A" in the first position of a term. The data model determines that the combined (weighted) probability of reading 'A' in the first position would be probability of 'A' in the data model, e.g., how certain is the data model that the first reading is 'A,' times the a-priori frequency of letter 'A,' e.g., how frequent is it to have 'A' in the first position. In this manner, the data model is operable to also compute a respective weighted probability for each character in the full code "AW124RT," character by character.

Referring now to FIG. 3B, the read-by-character model can generate respective characters that are used to generate one or more candidate terms (320). As indicated above, the intelligent extraction engine 120 causes the selected data model (e.g., a deep-learning model or classifier model) to generate a corresponding confidence score for each respective character as well as a corresponding overall confidence score for each candidate term generated from the respective characters (320). The intelligent extraction engine 120 determines that a candidate term requires error correction or refining based on the one or more factors described above with reference to FIG. 3A (322).

The intelligent extraction engine 120 uses the data refinement logic 140 and the data record & stochastic value module 145 to execute one or more example processes for refining the candidate terms based at least on a stochastic value (324). The data refinement logic 140 interacts with the data record & stochastic value module 145 to further refine a candidate term extracted from a document in an image based on one or more processes.

For example, the data refinement logic 140 refines or corrects an overall candidate term by refining one or more discrete characters in a string of characters that form the candidate term extracted from a document. In some implementations, the second candidate term (e.g., V5605QA1) is generated using the read-by-character model. When the read-by-character model is invoked or called to generate a candidate term, the intelligent extraction engine 120 causes the selected data model to generate a respective confidence score (or probability value) for each character in the second candidate term.

The intelligent extraction engine 120 determines whether the candidate term, including discrete values for characters in the term, matches (or substantially matches) a term or characters in a record stored in a database of the system (328). For example, the data refinement logic 140 can compute a match score that characterizes a suspected match between one or more discrete characters of a candidate term and discrete characters in the record stored in the database. The data refinement logic 140 selects a particular character value from the record in the database corresponding to the highest match score and either passes that character value as an output (e.g., a stochastic value) of this stochastic process or augments the candidate term to include the character value selected from the record in the database and passes the augmented candidate term as an output (e.g., a stochastic value) of this stochastic process (330). This particular stochastic process is described in more detail below with reference to FIG. 4.

Figure 4:
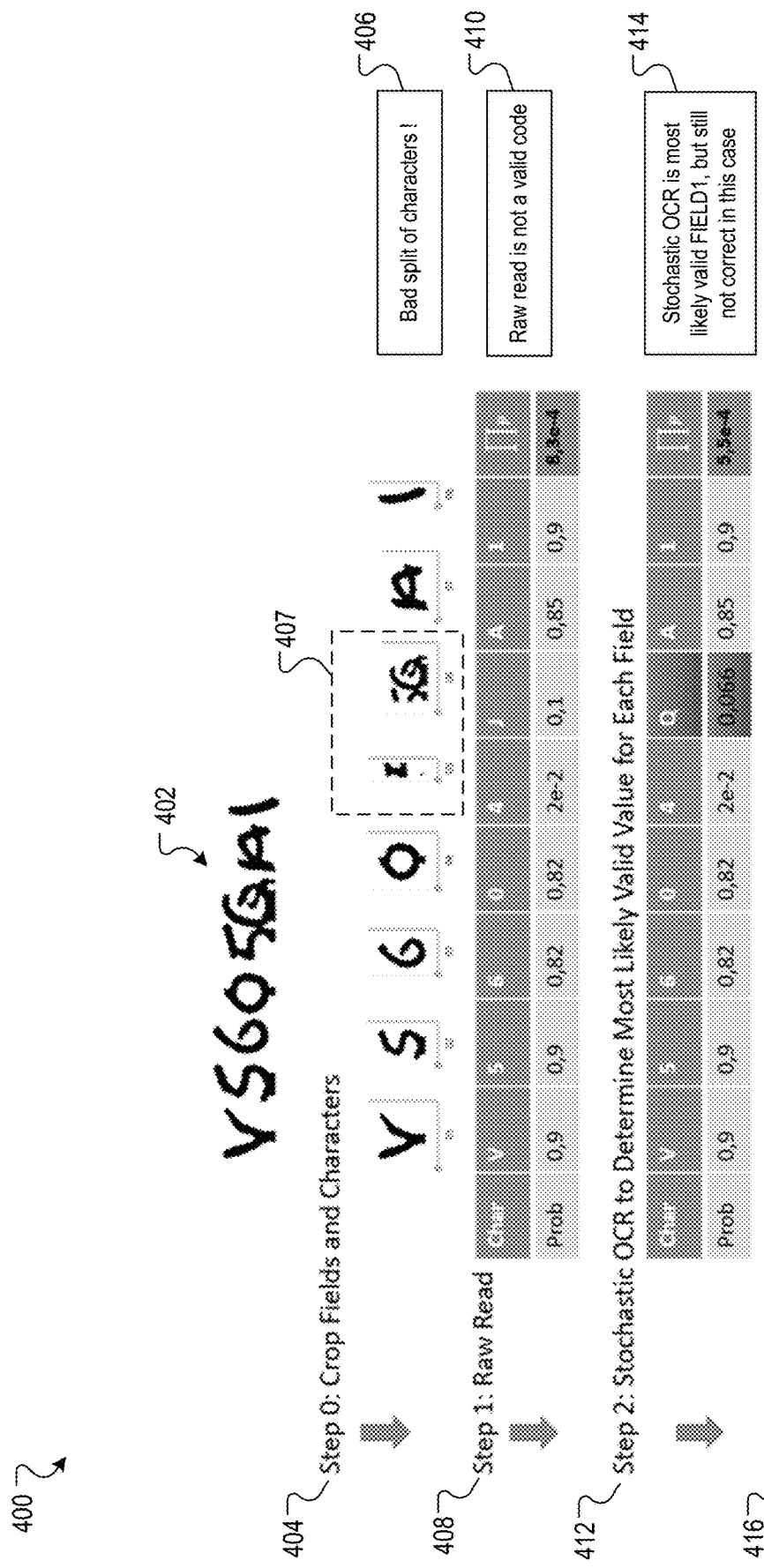
FIG. 4 shows a logic diagram that depicts example steps for obtaining a stochastic value used to refine a candidate term.

FIG. 4 shows a logic diagram 400 that depicts example steps for obtaining a stochastic value used to refine a candidate term. In the implementation of FIG. 4, the final term that is passed as a stochastic value or output of the stochastic process of FIG. 3B is "V5605QA1," which may correspond to a product identifier in an image of an item inventory card. The inventory card includes a product identifier 402 that is hand written in a data field of the inventory card. For example, the data field can be adjacent the document label "Product Identifier."

The intelligent extraction engine 120 is operable to perform character cropping based on image segmentation and character segmentation (404). For example, the content extractor 135 can use or interact with the deep-learning model to define or pre-select particular data fields or character regions of interest in the image of the document based on one or more identified templates.

The intelligent extraction engine 120 is operable to split handwritten text into particular discrete characters. For example, the intelligent extraction engine 120 can use the content extractor 135 to define one or more columns in a region of the image that includes a data field with handwritten text. The intelligent extraction engine 120 can compute a vertical sum of white pixels in each of the one or more columns that overlap the handwritten text in the data field. A value of a vertical sum of white pixels in a particular column that exceeds a threshold value can be used to locate a breaking point for splitting the handwritten text into particular discrete characters. In some examples, the intelligent extraction engine 120 detects an incorrect or bad split of the characters (406) when a candidate term derived for the handwritten text appears to include one or more unrecognized or extraneous characters (407). In some implementations, determining a split of handwritten text into particular discrete characters is performed by the intelligent extraction engine 120 as a preprocessing operation prior to performing a read-by-character process using a trained deep-learning model of machine-learning engine 160.

In the example of FIG. 4, a read-by-character model invoked by a deep-learning model of the machine-learning engine 160 performs a raw read of the data field in an image of an inventory card (408). The deep-learning model can output a probability value for each character extracted by the read-by-character model per each character position within an initial candidate term. For example, the data model outputs a probability value of 0.9 for the character value "V" at the first character position, a probability value of 0.9 for the character value "5" at the second character position, a probability value of 0.82 for the character value "6" at the third character position, a probability value of 0.82 for the character value "0" at the fourth character position, and so on.

As indicated above, in the example of FIG. 4 the incorrect or bad split of the characters causes unrecognized values in the candidate term derived for the handwritten text. This can cause the data model to output a probability value of 0.27 for the character value at the fifth character position and a probability value of 0.1 for the character value at the sixth character position. Further, because the term derived for the actual handwritten text includes unrecognized or extraneous characters, the data model detects that the output of the raw read operation is an invalid product identifier (410). Hence, in this example, because the term derived for the actual handwritten text includes unrecognized or extraneous characters, the candidate term may require stochastic OCR error correction or refining to determine the most likely valid value for at least a subset of the character values in the data field (412).

In some cases, an example stochastic OCR process that relies on analyzing a candidate term against a dictionary listing of valid terms (FIG. 3A), might yield a potential candidate term that has some valid character matchings, but the potential term might still be an invalid or incorrect product identifier (414). Hence, the intelligent extraction engine 120 uses a stochastic matching process to obtain a stochastic value for refining the candidate term based on a determined match between one or more discrete characters of the candidate term and discrete characters in a record stored in a reference database.

In some implementations, the reference database includes multiple candidate values, such as values for terms that have the same length as a result term output from the raw data read operation discussed above. For each candidate value or term in the reference database, an overall probability is computed through the average probability of the individual characters in candidate term in the reference database. The most likely candidate term of the reference database is then stored, as well as its overall probability, before proceeding to a next step of this stochastic process for database matching.

For each candidate value or term in the reference database that has the same characters as the result term output from the raw data read and in the same order, but with extra characters in between, an overall probability is also computed. If a particular candidate term of the reference database has a higher overall probability than the most likely candidate term of the reference database obtained in the previous step, that particular candidate term of the reference database having the higher overall probability is stored as a final result of the stochastic process for database matching. Similarly, the intelligent extraction engine 120 can compute a ranking of the top candidate terms or characters appearing in an example reference database using the overall probability of each of the candidate terms or characters.

Figure 5:
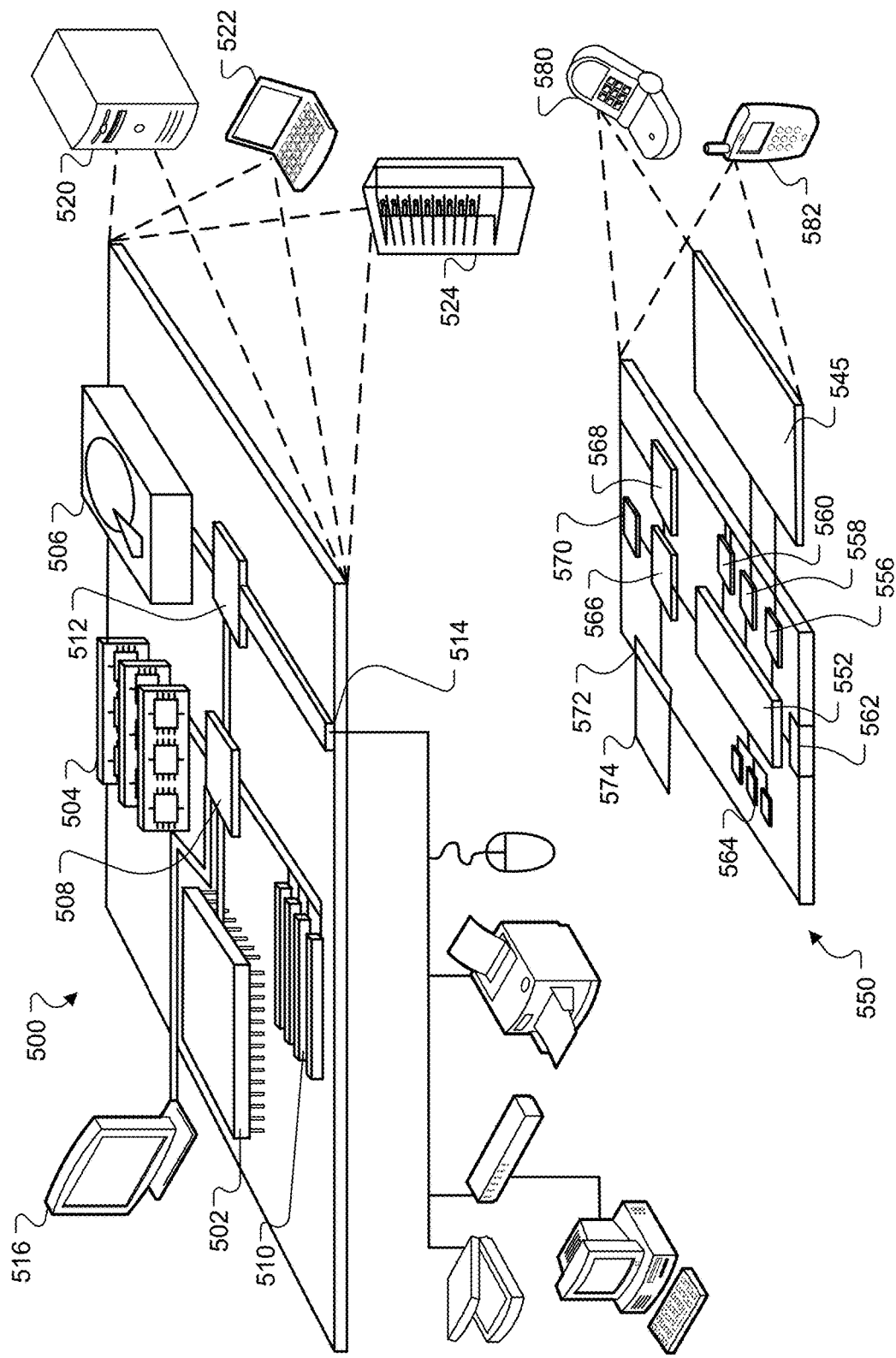
FIG. 5 shows a block diagram of a computing system that can be used in connection with computer-implemented methods described in this specification.

FIG. 5 shows a block diagram of a computing system that can be used in connection with computer-implemented methods described in this specification. Computing device 500 can correspond to system 100 described above or may be intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate images of documents included in input data 110 to the intelligent document analyzer 115 that executes one or more of the processes described herein to convert information in the documents to usable digital information, such as a digitized data string. An image sensor and/or image processor of device 550 may generate image files of input data 110, where the images can correspond to documents representing a discrete unit of digital content or electronic information (e.g., text data, electronic documents, data structures, electronic files, multimedia content, image data, or another unit of content).

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method comprising:
receiving, by a first module of a computing system, input data representing an image of a document;
receiving, by the first module of the computing system, context data for the document, wherein the context data comprises parameters that are descriptive of the document in the image represented by the input data;
processing, by the first module of the computing system, the input data and the context data to determine a complexity value that characterizes a level of complexity in identifying information to be extracted from the document;
selecting, based on the complexity value and from a plurality of candidate machine-learning models, a particular machine-learning model to use in extracting information from the document; and
extracting information from the document using the particular selected machine-learning model, comprising converting a portion of the image of the document that shows typed or handwritten text into a digitized text string.

2. The method of claim 1, wherein processing the input data and the context data comprises:
determining a quantity of labels, each label in the quantity of labels corresponding to a distinct portion of information in the document; and
identifying one or more reference templates that each correspond to the document based on the determined quantity of labels.

3. The method of claim 2, wherein determining the complexity value comprises:
determining that the quantity of labels exceeds a threshold quantity;
identifying a particular reference template in response to determining that the quantity of labels exceeds the threshold quantity; and
determining the complexity value based on the particular reference template.

4. The method of claim 3, wherein:
the particular reference template is a complex template comprising a plurality data fields,
each data field of the plurality of data fields corresponds to a respective label in the quantity of labels, and
each data field comprises a term corresponding to one or more terms in the extracted information that is converted into the digitized text string.

5. The method of claim 3, wherein selecting the particular machine-learning model comprises:
determining, based on the complexity value, that the level of complexity in identifying information to be extracted from the document exceeds a threshold level; and
selecting the particular machine-learning model in response to determining that the level of complexity exceeds the threshold level.

6. The method of claim 5, wherein selecting the particular machine-learning model comprises:
selecting a deep-learning model when (i) the quantity of labels exceeds the threshold quantity and (ii) the complexity value indicates the level of complexity in identifying information to be extracted from the document exceeds the threshold level.

7. The method of claim 5, wherein selecting the particular machine-learning model comprises:
selecting a machine-learning classifier when (i) the quantity of labels is below the threshold quantity and (ii) the complexity value indicates the level of complexity in identifying information to be extracted from the document is below the threshold level.

8. The method of claim 5, wherein:
selecting the particular machine-learning model comprises selecting the particular machine-learning model from a machine-learning engine,
the machine-learning engine includes at least two predictive models corresponding to the plurality of candidate machine-learning models, and
the at least two predictive models comprises: a machine-learning model that is operable to extract information relating to a region of interest in the image of the document; and a deep-learning model operable to read discrete terms in the region of interest or read discrete characters of the discrete terms in the region of interest.

9. The method of claim 8, wherein converting the portion of the image of the document into the digitized text string comprises:
using the deep-learning model to convert the extracted information from the document in response to reading the discrete terms in the region of interest.

10. The method of claim 8, wherein converting the portion of the image of the document into the digitized text string comprises:
using the deep-learning model to convert the extracted information from the document in response to reading the discrete characters of the discrete terms in the region of interest.

11. A system comprising:
one or more processing devices; and
one or more non-transitory machine-readable storage devices storing instructions that are executable by the one or more processing devices to cause performance of operations comprising:
receiving, by a first module of a computing system, input data representing an image of a document;
receiving, by the first module of the computing system, context data for the document, wherein the context data comprises parameters that are descriptive of the document in the image represented by the input data;
processing, by the first module of the computing system, the input data and the context data to determine a complexity value that characterizes a level of complexity in identifying information to be extracted from the document;
selecting, based on the complexity value and from a plurality of candidate machine-learning models, a particular machine-learning model to use in extracting information from the document; and
extracting information from the document using the particular selected machine-learning model, comprising converting a portion of the image of the document that shows typed or handwritten text into a digitized text string.

12. The system of claim 11, wherein processing the input data and the context data comprises:
determining a quantity of labels, each label in the quantity of labels corresponding to a distinct portion of information in the document; and
identifying one or more reference templates that each correspond to the document based on the determined quantity of labels.

13. The system of claim 12, wherein determining the complexity value comprises:
determining that the quantity of labels exceeds a threshold quantity;
identifying a particular reference template in response to determining that the quantity of labels exceeds the threshold quantity; and
determining the complexity value based on the particular reference template.

14. The system of claim 13, wherein:
the particular reference template is a complex template comprising a plurality data fields,
each data field of the plurality of data fields corresponds to a respective label in the quantity of labels, and
each data field comprises a term corresponding to one or more terms in the extracted information that is converted into the digitized text string.

15. The system of claim 13, wherein selecting the particular machine-learning model comprises:
determining, based on the complexity value, that the level of complexity in identifying information to be extracted from the document exceeds a threshold level; and
selecting the particular machine-learning model in response to determining that the level of complexity exceeds the threshold level.

16. The system of claim 15, wherein selecting the particular machine-learning model comprises:
selecting a deep-learning model when (i) the quantity of labels exceeds the threshold quantity and (ii) the complexity value indicates the level of complexity in identifying information to be extracted from the document exceeds the threshold level.

17. The system of claim 15, wherein selecting the particular machine-learning model comprises:
selecting a machine-learning classifier when (i) the quantity of labels is below the threshold quantity and (ii) the complexity value indicates the level of complexity in identifying information to be extracted from the document is below the threshold level.

18. The system of claim 15, wherein:
selecting the particular machine-learning model comprises selecting the particular machine-learning model from a machine-learning engine,
the machine-learning engine includes at least two predictive models corresponding to the plurality of candidate machine-learning models, and
the at least two predictive models comprises: a machine-learning model that is operable to extract data for a region of interest in the image of the document; and a deep-learning model operable to read discrete terms included in the region of interest or read discrete characters of the discrete terms in the region of interest.

19. The system of claim 18, wherein converting the portion of the image of the document into the digitized text string comprises:
using the deep-learning model to convert the extracted information from the document in response to reading the discrete terms in the region of interest; and
using the deep-learning model to convert the extracted information from the document in response to reading the discrete characters of the discrete terms in the region of interest.

20. One or more non-transitory machine-readable storage devices storing instructions that are executable by one or more processing devices to cause performance of operations comprising:
receiving, by a first module of a computing system, input data representing an image of a document;
receiving, by the first module of the computing system, context data for the document, wherein the context data comprises parameters that are descriptive of the document in the image represented by the input data;
processing, by the first module of the computing system, the input data and the context data to determine a complexity value that characterizes a level of complexity in identifying information to be extracted from the document;
selecting, based on the complexity value and from a plurality of candidate machine-learning models, a particular machine-learning model to use in extracting information from the document; and
extracting information from the document using the particular selected machine-learning model, comprising converting a portion of the image of the document that shows typed or handwritten text into a digitized text string.

* * * * *